United States Patent
Kitagishi et al.

(10) Patent No.: US 11,729,575 B2
(45) Date of Patent: Aug. 15, 2023

(54) BOARDING INTENTION DETERMINATION DEVICE, BOARDING INTENTION DETERMINATION METHOD AND NON-TRANSITORY COMPUTER READABLE STORAGE MEDIUM

(71) Applicant: YAHOO JAPAN CORPORATION, Tokyo (JP)

(72) Inventors: Ikuo Kitagishi, Tokyo (JP); Taro Watanabe, Tokyo (JP)

(73) Assignee: YAHOO JAPAN CORPORATION, Tokyo (JP)

( * ) Notice: Subject to any disclaimer, the term of this patent is extended or adjusted under 35 U.S.C. 154(b) by 1162 days.

(21) Appl. No.: 16/126,156

(22) Filed: Sep. 10, 2018

(65) Prior Publication Data

US 2019/0090083 A1 Mar. 21, 2019

(30) Foreign Application Priority Data

Sep. 20, 2017 (JP) ................................. 2017-180433

(51) Int. Cl.
*H04W 4/02* (2018.01)
*C07C 9/00* (2006.01)
*G07C 9/00* (2020.01)

(52) U.S. Cl.
CPC ................ *H04W 4/02* (2013.01); *G07C 9/00* (2013.01); *G06Q 2240/00* (2013.01)

(58) Field of Classification Search
CPC . H04W 4/02; H04W 4/00; G07C 9/00; G06Q 2240/00; G08G 1/202; G08G 1/096827; G08G 1/00; G08G 1/20; G08G 1/0129; G08G 5/0026; G08G 1/0104; G08G 1/096741; G07B 15/00; G07B 15/063
See application file for complete search history.

(56) References Cited

U.S. PATENT DOCUMENTS

2015/0031400 A1* 1/2015 Tian ...................... H04W 4/023
455/456.3
2017/0314948 A1* 11/2017 Racah ................ G01C 21/3438

FOREIGN PATENT DOCUMENTS

| JP | 2002-208091 A | | 7/2002 |
| JP | 2003317191 A | * | 11/2003 |
| JP | 2008111842 A | * | 5/2008 |
| JP | 2014516441 | * | 7/2014 |

(Continued)

OTHER PUBLICATIONS

Kumar et al., "Mobile Virtual Sensors: A Scalable Programming and Execution Framework for Smart Surveillance " (Year: 2008).*

(Continued)

*Primary Examiner* — Thien T Mai
(74) *Attorney, Agent, or Firm* — Oliff PLC

(57) ABSTRACT

A boarding intention determination device according to the present application includes an acquisition unit and a determination unit. The acquisition unit acquires a positional relationship between boarding position information representing a boarding spot for boarding a mobile object and user position information representing a current position of a user. The determination unit determines whether the user has an intention to board the mobile object based on the positional relationship that is acquired by the acquisition unit and behavior information representing behaviors of the user.

13 Claims, 7 Drawing Sheets

(56) References Cited

FOREIGN PATENT DOCUMENTS

JP    2017-124899 A    7/2017

OTHER PUBLICATIONS

Holman et al., "SketchSpace: Designing Interactive Behaviors with Passive Materials" (Year: 2011).*
Dec. 1, 2017 Office Action issued in Japanese Patent Application No. 2017-180433.

* cited by examiner

FIG.3

| PREFECTURE | BUSINESS OPERATOR | ROUTE ID | POSITION INFORMATION (COORDINATES) | ... |
|---|---|---|---|---|
| TOKYO | TK TRANSPORT | 20 | X1, Y1 | ... |
| | | 21 | X2, Y2 | ... |
| | | 22 | X3, Y3 | ... |
| | ... | ... | ... | ... |
| KANAGAWA | ... | ... | ... | ... |
| ... | ... | ... | ... | ... |

FIG.4

| USER ID | AGE | GENDER | PHYSICAL INFORMATION | ... |
|---|---|---|---|---|
| U1 | 33 | FEMALE | PREGNANT | ... |
| U2 | 25 | MALE | NON | ... |
| U3 | 67 | FEMALE | WHEELCHAIR | ... |
| ... | ... | ... | ... | ... |

FIG.5

| BUSINESS OPERATOR | ROUTE ID | DATE AND TIME INFORMATION | DELAY INFORMATION | 123 |
|---|---|---|---|---|
| TK TRANSPORT | 20 | SEP. 5th 2017 8:15 TO 8:30 | ZONE X1 | ⋮ |
| | | SEP. 4th 2017 8:05 TO 8:30 | ZONE X1 | ⋮ |
| | ⋮ | ⋮ | ⋮ | ⋮ |
| ⋮ | ⋮ | ⋮ | ⋮ | ⋮ |

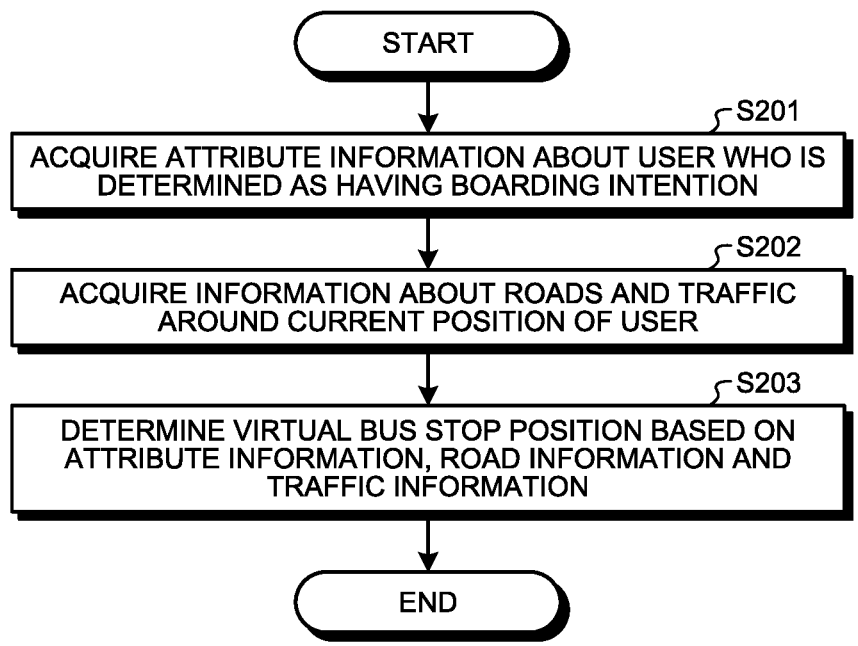
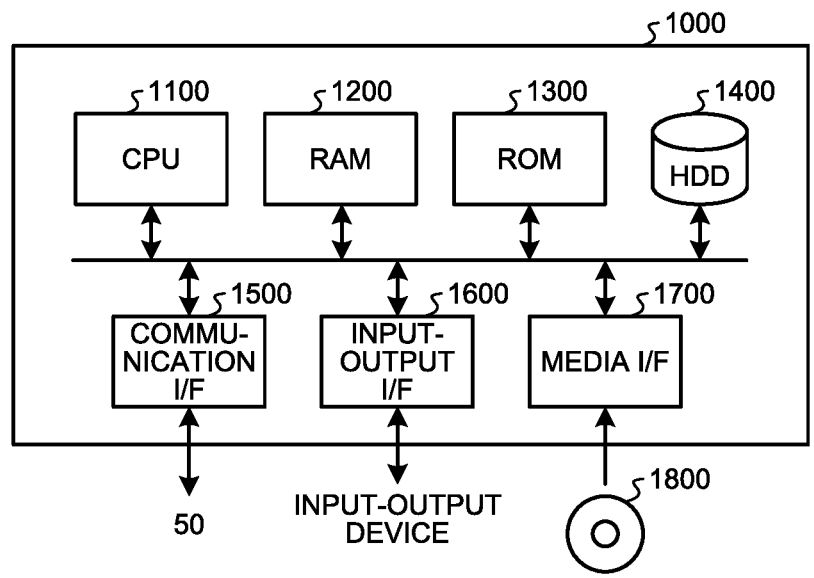

BOARDING INTENTION DETERMINATION DEVICE, BOARDING INTENTION DETERMINATION METHOD AND NON-TRANSITORY COMPUTER READABLE STORAGE MEDIUM

CROSS-REFERENCE TO RELATED APPLICATION(S)

The present application claims priority to and incorporates by reference the entire contents of Japanese Patent Application No. 2017-180433 filed in Japan on Sep. 20, 2017.

BACKGROUND OF THE INVENTION

1. Field of the Invention

Embodiments of the present invention relate to a boarding intension determination device, a boarding intention determination method and a boarding intention determination program.

2. Description of the Related Art

Conventionally, technologies to manage bus services have been disclosed.

For example, Japanese Laid-open Patent Publication No. 2002-208091 discloses a technology to reduce a strain on a driver that relates to service operations while increasing efficiency of bus services.

The above-described technology does not necessarily make it possible to carry a user who uses transportation to a destination efficiently while increasing convenience to the user. For example, according to the aforementioned conventional technology, when a boarding request occurs at a bus stop, a service route that connects a place of departure to a destination is changed to go through the bus stop at which the boarding request occurs.

The boarding request herein can be a reservation to board a bus that is made by a user or a request for bus service delivery to a spot without reservation (instant call). In such a case, the user may forget making the boarding reservation or making the instant call and accordingly changing the service route may come to nothing. Furthermore, a procedure taken by the user to make a boarding reservation or make an instant call may be complicated. For this reason, the aforementioned conventional technology does not necessarily make it possible to carry a user who uses transportation to a destination efficiently while increasing convenience to the user.

SUMMARY OF THE INVENTION

It is an object of the present invention to at least partially solve the problems in the conventional technology.

According to one aspect of an embodiment, A boarding intention determination device includes an acquisition unit that acquires a positional relationship between boarding position information representing a boarding spot for boarding a mobile object and user position information representing a current position of a user. The boarding intention determination device includes a determination unit that determines whether the user has an intention to board the mobile object based on the positional relationship that is acquired by the acquisition unit and behavior information representing behaviors of the user.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 is a diagram illustrating an exemplary virtual bus stop position information storage according to the embodiment;

FIG. 4 is a diagram illustrating an exemplary user information storage according to the embodiment;

FIG. 5 is a diagram illustrating an exemplary service record storage according to the embodiment;

FIG. 8 is a flowchart illustrating an exemplary position determination process according to the embodiment; and FIG. 9 is a hardware configuration diagram illustrating an exemplary computer that realizes functions of the boarding intension determination device.

DETAILED DESCRIPTION OF THE PREFERRED EMBODIMENTS

Modes for carrying out a boarding intention determination device, a boarding intention determination method and a boarding intention determination program according to the present application (hereinafter, referred to as "embodiments") will be described below with reference to the drawings. Note that the embodiments do not limit the boarding intention determination device, the boarding intention determination method and the boarding intention determination program according to the present application. In the following embodiments, the same components are denoted with the same reference numbers and redundant descriptions thereof will be omitted.

1. Boarding Intension Determination Process

Figure 1:
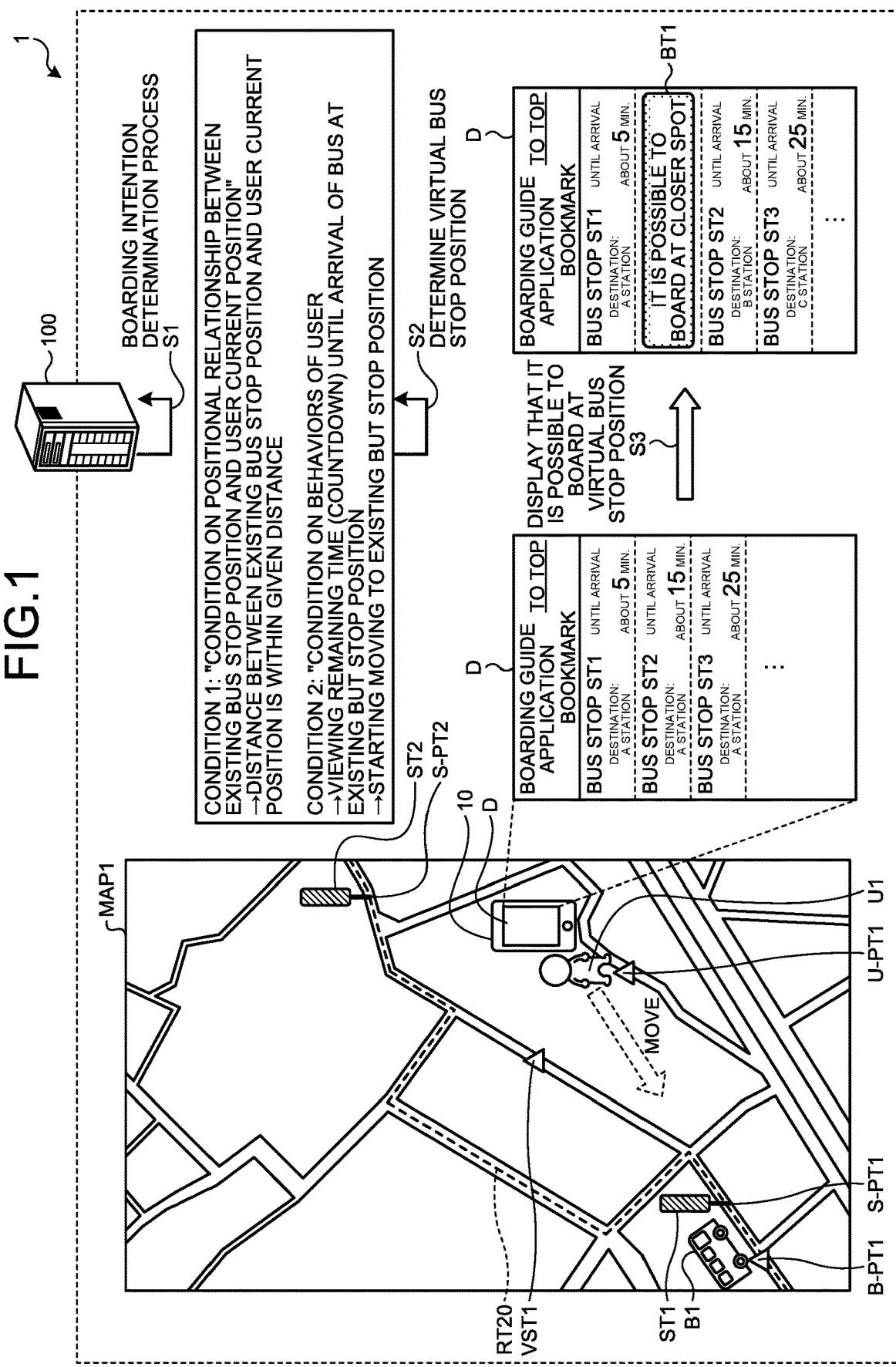
FIG. 1 is a diagram illustrating an exemplary boarding intention determination process according to an embodiment.

First of all, using FIG. 1, an exemplary boarding intention determination process according to an embodiment will be described. FIG. 1 is a diagram illustrating an exemplary boarding intention determination process according to the embodiment. A boarding intention determination system 1 according to the embodiment includes a boarding intention determination device 100 and a terminal device 10. The boarding intention determination process according to the embodiment is performed by the boarding intention determination device 100 illustrated in FIG. 1. For example, the boarding intention determination device 100 is an information processing device that is realized by a single or multiple devices, such as a server device or a cloud system, and that is capable of communicating with the terminal device 10 that a user uses via a network (see FIG. 2), such as a mobile communication network or a local area network (LAN).

The terminal device 10 is an information processing device that is used by the user. The terminal device 10 is, for example, a smartphone, a tablet terminal, a note personal computer (PC), a laptop PC, a mobile phone, or a personal digital assistant (PDA). An application that enables searching services of route buses and positions of bus stops (referred to as "boarding guidance application AP" below) is installed in the terminal device 10 in advance.

In cooperation with the boarding intention determination device 100 according to the embodiment, the boarding guide application AP acquires various types of information about route buses from the boarding intention determination device 100 and represents the acquired information to the user. For example, the user is able to "bookmark" names of bus stops that the user uses routinely in the boarding guide application AP. In such a case, the boarding guide application AP acquires information about the "bookmarked" bus stops from the boarding intention determination device 100 at given timing and represents the information to the user.

Presupposition of the boarding intention determination process performed by the boarding intention determination device 100 according to the embodiment to be described below will be described. First of all, a mobile object on which the boarding intention determination device 100 makes determination is an "on-demand bus". The on-demand bus according to the embodiment is of one type of route bus. When the user takes a procedure using a communication means, such as the Internet, for example, the bus goes to a bus stop that is set virtually to pick the user up via a roundabout route outside a basic route. The bus stop that is set virtually as described above against conventional physical bus stops that are on the basic route (also referred to as "existing bus stops" below) is referred to as "virtual bus stop".

The boarding intention determination device 100 is able to set a virtual bus stop in a given position in consideration of attribute information about the user, road information, traffic condition, etc., and heads the on-demand bus toward the set virtual bus stop; however, there is a case where the user who is supposed to board the on-demand bus is not there although the on-demand bus goes around the basic route toward the virtual bus stop and taking the roundabout comes to nothing. In other words, efficiency of on-demand bus services deteriorates. In order to resolve the situation, it is necessary to accurately determine whether the user has an intention to board the on-demand bus. When the user has an intension to board the on-demand bus, it is necessary to set a "virtual bus stop" in a position that is easily usable by the user and guide the user to the position in which the virtual bus stop is set.

In accordance with the above-described presupposition, the boarding intension determination device 100 according to the embodiment acquires a positional relationship between boarding position information representing a boarding spot for boarding the mobile object and user position information representing the current position of the user and, based on the acquired position information and behavior information representing behaviors of the user, determines whether the user has an intension to board the mobile object.

Specifically, when the positional relationship meets given condition information, the boarding intention determination device 100 determines that the user has an intention to board the mobile object. When the behavior information representing behaviors of the user meets the given condition information, the boarding intention determination device 100 determines that the user has an intention to board the mobile object. The aforementioned two conditions that are the condition information on the positional relationship and the condition information on the behavior information will be described below. The mobile object is an on-demand bus. The boarding spot for boarding the mobile object is a physical bus stop for boarding the on-demand bus, that is, an existing bus stop. The boarding position information is information about the position in which the existing bus stop is positioned (existing bus stop position). Using FIG. 1, an exemplary boarding intention determination process will be described below.

First of all, MAP1 illustrated in FIG. 1 will be described. MAP1 represents a map surrounding a user U1 who uses the boarding guide application AP. In MAP1, information about a position in which an existing bus stop ST1 is positioned (exemplary boarding position information) is "S-PT1". In MAP1, information about a position in which an existing bus stop ST2 is positioned (exemplary boarding position information) is "S-PT2". In MAP1, the user position information representing the current position of the user U1 who uses the boarding guide application AP is "U-PT1". In MAP1, position information representing the current position of an on-demand bus B1 is "B-PT1". In MAP1, a basic route RT20 on which the on-demand bus B1 travels (that can be also referred to as Route 20) is represented by the dotted line.

In such a state, the boarding intension determination device 100 determines whether the user U1 starts the boarding guide application AP. In order to simplify descriptions, assume here that, when the terminal device 10 receives an instruction to start the boarding guide application AP from the user U1, the terminal device 10 displays information about existing bus stops that are bookmarked by the user U1 on a display screen D. As illustrated in FIG. 1, the terminal device 10 gives a display of the names of three existing bus stops (the bus stop ST1, the bus stop ST2 and a bus stop ST3) that are bookmarked by the user U1 and gives a countdown display of the remaining times until arrival of the on-demand bus B1 at the respective bus stops in real time.

Such display is enabled because the boarding intention determination device 100 performs the following process. For example, the boarding intention determination device 100 determines an on-demand bus that stops in each of the bookmarked existing bus stops in response to a request from the terminal device 10 and, as needed, acquires current position information about the determined on-demand bus in real time. The boarding intention determination device 100 calculates the remaining times based on the current position of the on-demand bus, the positions of the existing bus stops and the speed at which the on-demand bus travels. The boarding intention determination device 100 sends back the calculated remaining times to the terminal device 10 to gives a countdown display of the calculated remaining times.

The boarding intention determination device 100 performs the boarding intention determination process (step S1). The boarding intention determination device 100 determines whether a positional relationship between the petition of an existing bus stop and the current position of the user U1 meets given condition information (condition information on the positional relationship). Specifically, as for the given condition information, the boarding intention determination device 100 determines whether a distance between the existing bus stop position and the current position of the user U1 is within a given distance. In the embodiment, the given distance is a distance for which it is predicted that a time required by the user U1 to move from the current position of the user U1 to the existing bus stop position is shorter than a time until arrival of the on-demand bus B1 at the existing bus stop position.

For example, the boarding intension determination device 100 acquires the position information about the existing bus stops ST1 to ST3 that are bookmarked and the current position information about the user U1, thereby acquiring positional relationships each between the position information about each of the existing bus stops ST1 to ST3 and the current position information about the user U1. In the example in FIG. 1, the boarding intention determination device 100 determines that the positional relationship between the position information about the existing bus stops ST1 and ST2, among the existing bus stops ST1 to ST3, and the current position information about the user U1 meet the condition information on the aforementioned positional relationship.

The boarding intention determination device 100 determines whether behavior information representing behaviors of the user U1 meets the given condition information (the condition information on the behavior information). Specifically, as for the given condition information, the boarding intention determination device 100 determines whether the user U1 views time information representing a time until arrival of the on-demand bus B1 at any one of the existing bus stops ST1 and ST2, which are determined as meeting the condition information on the positional relationship, that is, the countdown display. As for the given condition information, the boarding intention determination device 100 determines whether the user U1 starts moving toward the existing bus stop ST1 or ST2 in the state where the user U1 views the countdown display.

For example, the boarding intention determination device 100 acquires the current position information about the user U1 in real time as needed and analyzes changes of the current position of the user U1, thereby determining whether the user U1 starts moving and, when the user starts moving, determining in which direction the user is moving. In the example illustrated in FIG. 1, the boarding intention determination device 100 determines that the user U1 starts moving toward the existing bus stop ST1.

As described above, when both the condition information on the positional relationship and the condition information on the behavior information are met, the boarding intention determination device 100 determines that the user U1 has an intention to board the on-demand bus B1. Accordingly, in the example illustrated in FIG. 1, the boarding intention determination device 100 determines that the user U1 has an intention to board the on-demand bus B1.

The boarding intention determination device 100 determines that the user U1 has a boarding intention and accordingly performs a position determination process to determine a position in which a virtual bus stop is to be set (virtual bus stop position) (step S2). For example, the boarding intention determination device 100 determines a virtual bus stop position based on attribute information about the user U1, road information about roads around the current position of the user U1 (about an area within a radius of 200 meters about the current position of the user U1), and traffic information about traffic around the current position of the user U1. In an example, as the user U1 is moving toward the existing bus stop ST1, the boarding intention determination device 100 determines a virtual bus stop position such that the distance from the current position of the user U1 to the virtual bus stop position is shorter than the distance from the current position of the user U1 to the position of the existing bus stop ST1. The example in FIG. 1 illustrates the example where the boarding intention determination device 100 determines the position denoted by "VST1" as the virtual bus stop position.

On determining the virtual bus stop position, the boarding intention determination device 100 represents that it is possible to board the on-demand bus B1 at the determined virtual bus stop position to the user U1 (step S3). For example, the boarding intention determination device 100 controls the terminal device 10 to cause the terminal device 10 to display a button BT1 on which "You can board at a closer spot" is displayed as illustrated in FIG. 1 as information representing that it is possible to board the on-demand bus B1 at the virtual bus stop position. Although not illustrated in the drawings, the boarding intention determination device 100 gives the on-demand bus B1 an instruction to travel a roundabout route on which the virtual bus stop position is positioned in "VST1".

As described above, the boarding intension determination device 100 according to the embodiment acquires the positional relationship between the boarding position information representing the boarding spot for boarding the mobile object and the user position information representing the current position of the user and, based on the acquired positional relationship and the behavior information representing behaviors of the user, determines whether the user has an intention to board the mobile object.

Thus, the boarding intension determination device 100 according to the embodiment is able to determine a user who has a boarding intention accurately. Accordingly, for example, it is possible to effectively avoid a situation where, although the mobile object takes a roundabout route, the user is not at the spot on the roundabout route and thus taking the roundabout route comes to nothing. As a result, the boarding intention determination device 100 is able to carry the user to the destination efficiently.

The boarding intention determination device 100 according to the embodiment is able to set a virtual bus stop in a closer position than to the existing bus stop and thus is able to shorten the travel distance to the bus stop. In other words, the boarding intention determination device 100 is able to increase convenience to the user in using on-demand buses.

2. Configuration of Boarding Intention Determination Device

Figure 2:
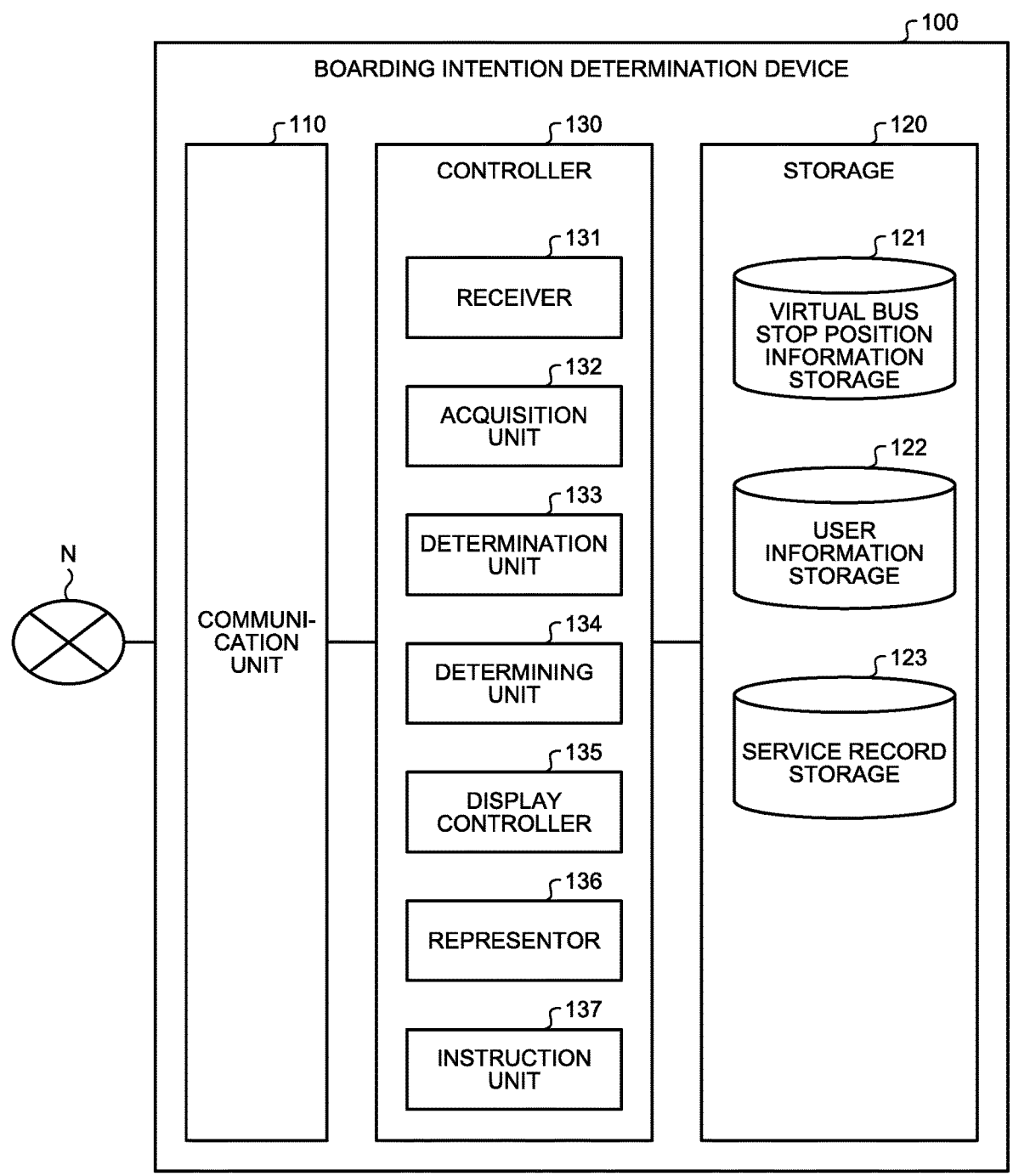
FIG. 2 is a diagram illustrating an exemplary configuration of a boarding intension determination device according to the embodiment.

Using FIG. 2, the boarding intention determination device 100 according to the embodiment will be described. FIG. 2 is a diagram illustrating an exemplary configuration of the boarding intention determination device 100 according to the embodiment. As illustrated in FIG. 2, the boarding intention determination device 100 includes a communication unit 110, a storage 120 and a controller 130.

About Communication Unit 110

The communication unit 110 is realized by, for example a network interface card (NIC), etc. The communication unit 110 is connected to a network N in a wired or a wireless manner and communicates information with the terminal device 10.

About Storage 120

The storage 120 is realized by, for example, a semiconductor memory device, such as a random access memory (RAM) or a flash memory, or a storage device, such as a hard disk or an optical disk. The storage 120 includes a virtual bus stop position information storage 121, a user information storage 122, and a service record storage 123.

Virtual Bus Stop Position Information Storage 121

The virtual bus stop position information storage 121 is a storage that stores possible positions in each of which a virtual bus stop is set. FIG. 3 illustrates the exemplary virtual bus stop position information storage 121 according to the embodiment. In the example in FIG. 3, the virtual bus stop position information storage 121 has items "prefecture", "business operator", "route ID", "position information (coordinates)", etc.

A "business operator" represents the name of a route bus service operator existing in the corresponding "prefecture". A "route ID" is identification information representing a route on which a route bus that is managed by the corresponding "business operator" travels. A set of "position information (coordinates)" represents position information that represents a position in which a virtual bus stop can be set and that represents a possible position in which a virtual bus stop is to be set.

In other words, the example in FIG. 3 represents an example where it is possible to set a virtual bus stop in a position "X1, Y1" on a route (Route 20) that is identified by a route ID "20" among routes on which route buses that are managed by a route bus service operator "TK travel" existing in a prefecture "Tokyo".

About User Information Storage 122

The user information storage 122 is a storage that stores various types of information (for example, attribute information) about users. FIG. 4 illustrates the exemplary user information storage 122 according to the embodiment. In the example in FIG. 4, the user information storage 122 has items "user ID", "age", "gender", "physical information", etc.

A "user ID" represents identification information that identifies a user or the terminal device 10 of the user. An "age" represents the age of a user. A "gender" represents the gender of a user. "Physical information" represents physical information (such as a disease or a disorder) that may cause a strain on a user.

In other words, the example in FIG. 4 exemplifies that the user who is identified by the user ID "U1" (user U1) corresponds to an age "33", a gender "female" and physical information "pregnant".

About Service Record Storage 123

The service record storage 123 is a storage that stores information about the service record of route buses. FIG. 5 illustrates the exemplary service record storage 123 according to the embodiment. In the example in FIG. 5, the service record storage 123 has items "business operator", "route ID", "date and time information", "delay information", etc.

A "business operator" represents the name of a route bus business operator. A "route ID" is identification information representing a route on which a route bus that is managed by the corresponding "business operator" travels. "Date and time information" represents a date and time on and at which a route bus travels a zone that is represented by "delay information. "Delay information" represents a zone where a delay occurs in the service schedule on a route that is identified by a "route ID". For example, in a zone having successive bus stops at which many passengers get on or get off buses, a delay tends to occur in the service schedule.

In other words, the example in FIG. 5 represents an example where a delay occurs in a service schedule in a zone X1 during date and time information "Sep. 5, 2017 8:15~8:30" on the route (route 20) that is identified by the route ID "20".

The service record storage 123 may store the date and time information representing a date and time on and at which traffic jam occurs in association with each other.

About Controller 130

FIG. 2 will be referred back. The controller 130 is realized in a way that a central processing unit (CPU), a micro processing unit (MPU), or the like, executes various programs that are stored in a storage device in the boarding intention determination device 100 using a RAM as a work area. The controller 130 is realized by, for example, an integrated circuit, such as an application specific integrated circuit (ASIC) or a field programmable gate array (FPGA).

As illustrated in FIG. 2, the controller 130 includes a receiver 131, an acquisition unit 132, a determination unit 133, a determining unit 134, a display controller 135, a representor 136 and an instruction unit 137 and realizes or executes functions and effects of information processing to be described below. The internal configuration of the controller 130 is not limited to the configuration illustrated in FIG. 2, and another configuration may be employed as long as the configuration enables the information processing to be described below. A connection relationship between the processors of the controller 130 is not limited to the connection relationship illustrated in FIG. 2 and another connection relationship may be employed.

About Receiver 131

The receiver 131 receives various types of information from the terminal device 10. For example, the receiver 131 receives a request for distribution of content and information about the content.

About Acquisition Unit 132

The acquisition unit 132 acquires a positional relationship between boarding position information representing a boarding spot for boarding a mobile object and user position information representing the current position of the user. The acquisition unit 132 may acquire mobile object position information representing the current position of the mobile object. Based on the acquired information, the acquisition unit 132 is able to calculate information to be represented to the user. According to descriptions using the example in FIG. 1, the acquisition unit 132 is able to calculate remaining times until arrival of the on-demand bus B1 at the respective existing bus stops ST1 to ST3.

Determination Unit 133

The determination unit 133 determines whether the user has an intention to board the mobile object based on the positional relationship, which is acquired by the acquisition unit 132, and the behavior information representing behaviors of the user. Specifically, the determination unit 133 determines that the user has an intention to board the mobile object when the position information that is acquired by the acquisition unit 132 meets the given condition information.

For example, as for the case where the given condition information is met, when the distance between the boarding spot for boarding the mobile object and the current position of the user is within a given distance, the determination unit 133 determines that the user has an intention to board the mobile object. This aspect will be described more in detail. As for the given distance, when the distance is within a distance for which it is predicted that the time required by the user to move from the current position of the user to the boarding spot is within the given time, the determination unit 133 determines that the user has an intention to board the mobile object. The given time is a time until arrival of the mobile object at the boarding spot.

Furthermore, when the behavior information representing behaviors of the user meets the given condition information, the determination unit 133 determines that the user has an intention to board the mobile object. Specifically, as for the case where the given condition information is met, when the user views the content about the boarding spot for boarding the mobile object, the determination unit 133 determines that the user has an intention to board the mobile object.

As for the case where the given condition information is met, when the user views the time information representing the time until arrival of the mobile object at a boarding spot, among the boarding spots for boarding the mobile object, at a distance from the current position of the user is within the given distance, the determination unit 133 determines that the user has an intention to board the mobile object. More specifically, when the user starts moving toward the boarding spot for boarding the mobile object in the state where the user views the time information, the determination unit 133 determines that the user has an intention to board the mobile object.

About Determining Unit 134

The determining unit 134 determines a position in which a virtual boarding spot that is a boarding spot for boarding the mobile object and that is virtual. For example, when a boarding spot for boarding the mobile object is within a given area from the current position of the user, the determining unit 134 determines a position in which a virtual boarding spot is to be set based on the user position information representing the current position and the boarding position information representing the boarding spot.

About Display Controller 135

The display controller 135 performs display control on content displayed on the terminal device 10. In the example in FIG. 1, the display controller 135 generates content to be displayed on the display screen D of the terminal device 10 according to the boarding guide application AP. The display controller 135 performs display control such that the generated content is displayed on the display screen D of the terminal device 10.

Representor 136

The representor 136 represents content to the user, for example, the representor 136 represents that it is possible to board the mobile object at the virtual boarding spot whose position is determined by the determining unit 134 to the user. Furthermore, on accepting indication of the intention to board at the virtual boarding spot, the representor 136 represents guide information to lead the user to the virtual boarding spot. Representation of the information by the representor 136 to the user corresponds to distribution of the information by the representor 136 to the terminal device 10 of the user.

About Instruction Unit 137

The instruction unit 137 instructs the mobile object to move to the position that is the position determined by the determining unit 134 and in which the virtual boarding spot is set. For example, the instruction unit 137 determines a roundabout route to the position in which the virtual boarding spot is set based on the original route on which the mobile object travels and instructs the mobile object to travel on the determined roundabout route.

3. Exemplary Effects of Boarding Intention Determination Process

Figure 6:
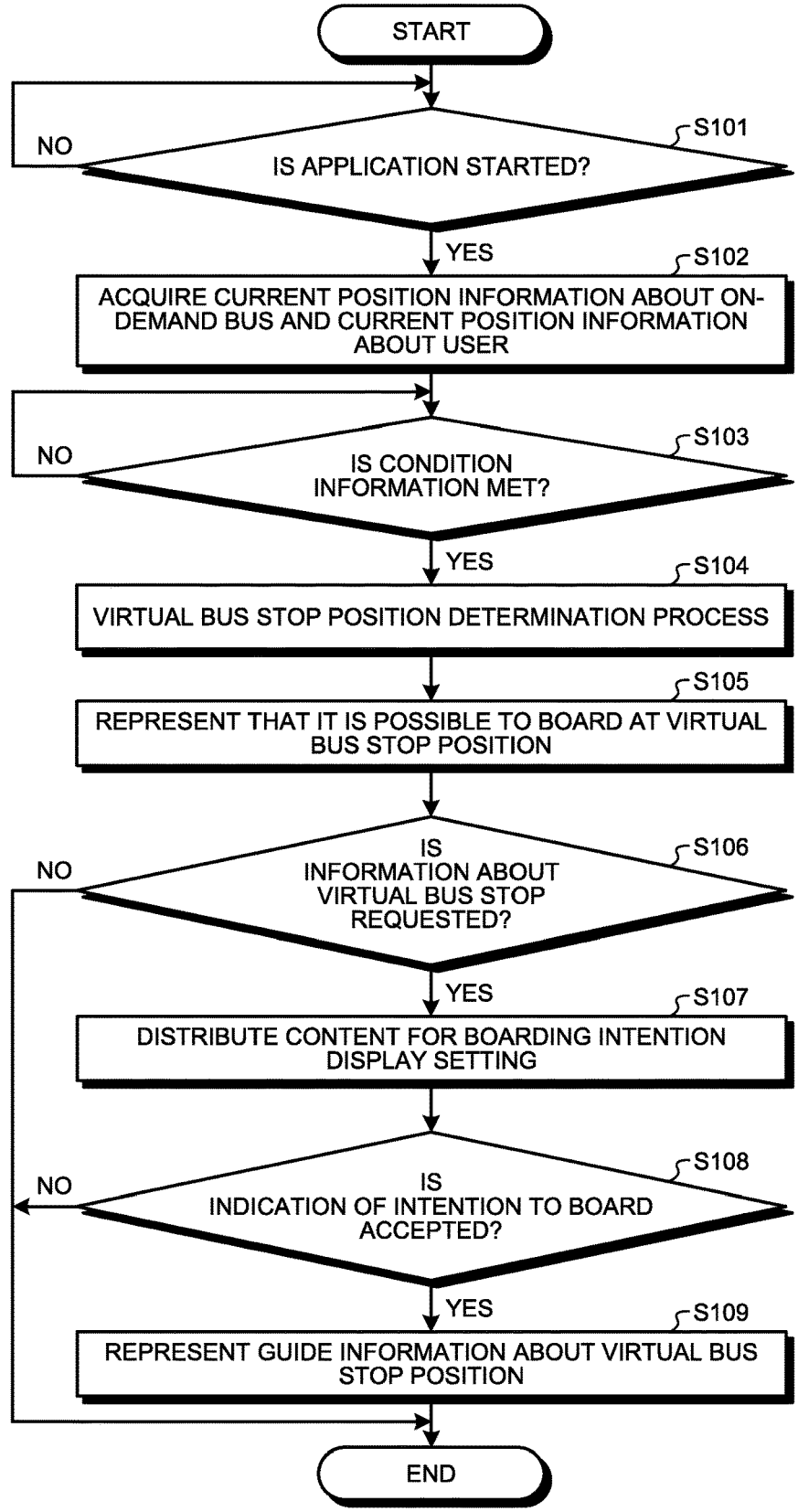
FIG. 6 is a flowchart illustrating the exemplary boarding intension determination process according to the embodiment.

Using the flowchart illustrated in FIG. 6, the content of the process that is executed and realized by the processors 131 to 137 will be described. FIG. 6 is a flowchart illustrating an exemplary boarding intention determination process according to the embodiment. The example in FIG. 1 will be used properly.

First of all, the receiver 131 determines whether the receiver 131 receives information indicating that the boarding guide application AP is started from the terminal device 10 of each user (S101). When the receiver does not receive the information indicating that the boarding guide application AP is started (NO at step S101), the receiver 131 waits until the reception. For example, the receiver 131 receives the information indicating that the boarding guide application AP is started from the terminal device 10 of the user U1.

The user U1 bookmarks the existing bus stops ST1, ST2 and ST3 (ST1 to ST3) in the boarding guide application AP. When the receiver 131 receives the information indicating that the boarding guide application AP is started (YES at step S101), the acquisition unit 132 determines an on-demand bus that stops at the existing bus stops ST1 to ST3 and acquires the current position information about the determined on-demand bus in real time as needed. The acquisition unit 132 calculates remaining times until arrival of the on-demand bus B1 at the respective existing bus stops ST1 to ST3 based on the current position of the on-demand bus B1 that is determined as one that stops at the existing bus stops ST1 to ST3, position information about each of the existing buses ST1 to ST3, and the travel speed of the on-demand bus B1.

As illustrated in FIG. 1, the representor 136 distributes, to the terminal device 10, content (a bookmark screen) that is controlled by the display controller 135 such that a countdown display of the remaining times until arrival of the on-demand bus B1 at the respective existing bus stops ST1 to ST3 is made.

In such a state, the determination unit 133 determines whether the user U1 meets the determined condition information in the boarding intention determination process. First of all, the acquisition unit 132 acquires positional relationships each between position information of each of the existing bus stops ST1 to ST3 that are boarding spots for boarding the on-demand bus B1 (collectively referred as existing bus stop positions) and the current position information about the user U1 (step S102). The boarding intention determination device 100 is able to store the position information about the existing bus stop positions in a given storage in the boarding intention determination device 100 to enable the acquisition unit 132 to acquire the position information about the existing bus stop positions.

The determination unit 133 determines whether the user U1 meets the determined condition information in the boarding intention determination process (step S103). Specifically, the determination unit 133 determines whether a positional relationship between an existing bus stop position and the current position of the user U1 meets the given condition information (the condition information on the positional relationship). Specifically, as for the given condition information, the determination unit 133 determines whether the distance between the existing bus stop position and the current position of the user U1 is within the given distance. More specifically, as for the given distance, the determination unit 133 determines whether the distance is a distance for which it is predicted that the time required by the user U1 to move from the current position of the user to the existing bus stop is within the given time. The given time is, for example, a time until arrival of the on-demand bus B1 at the existing bus stop position. Here, the determination unit 133 determines that the positional relationships between the position information about the existing bus stops ST1 and ST2 and the current position information about the user U1 meet the condition information on the positional relationship.

The determination unit 133 determines whether the behavior information representing behaviors of the user U1 meets the given condition information (the condition information on the behavior information). Specifically, as for the given condition information, the determination unit 133 determines whether the user U1 views the time information representing a time until arrival of the on-demand bus B1 at any one of the existing bus stops ST1 and ST2 that are determined as meeting the condition information on the positional relationship, i.e., the countdown display. More specifically, as for the given condition information, the determination unit 133 determines whether the user U1 starts moving toward the existing bus stop ST1 or ST2 in the state where the user U1 views the countdown display. Here, the determination unit 133 determines that the user U1 starts moving toward the existing bus stop ST1.

In the above-described example, both the condition information on the positional relationship and the condition information on the behavior information are met and accordingly the determination unit 133 determines that the user U1 has an intention to board the on-demand bus B1. When it is determined that the condition information is not met (NO at step S103), the determination unit 133 waits until the condition information is met. Alternatively, when it is determined that the condition information is not met (NO at step S103), the determination unit 133 may end the process. In response to the determination by the determination unit 133 that the user U1 has an intention to board the on-demand bus B1 (YES at step S103), the determining unit 134 performs the position determination process to determine a position in which a virtual bus stop is to be set (step S104). A detailed procedure of the position determination process will be described below. Here, as described in the example in FIG. 1, the determining unit 134 determines the position denoted by "VST1" in MAP as the virtual bus stop position.

In that case, the representor 136 represents that it is possible to board the on-demand bus B1 at the virtual bus stop position "VST1" that is determined by the determining unit 134 (step S105). For example, the display controller 135 performs display control on the button BT1 on which "You can board at a closer spot" is displayed as illustrated in FIG. 1 as information representing that it is possible to board the on-demand bus B1 at the virtual bus stop position "VST1". The representor 136 displays the button BT1 on which the display control is performed between the information about the existing bus stop ST1 and the information about the existing bus stop ST2 as illustrated in FIG. 1.

In such a state, the representor 136 determines whether the user requests detailed information about the virtual bus stop position "VST1" (step S106). In other words, the representor 136 determines whether the user U1 presses the button BT1. When it is determined that the button BT1 is not pressed (NO at step S106), the representor 136 ends the process. On the other hand, when it is determined that the button BT1 is pressed (YES at step S106), the representor 136 distributes, to the user U1, content C1 to enable the user U1 to indicate an intention to board at the virtual bus stop position "VST1" (step S107).

Figure 7:
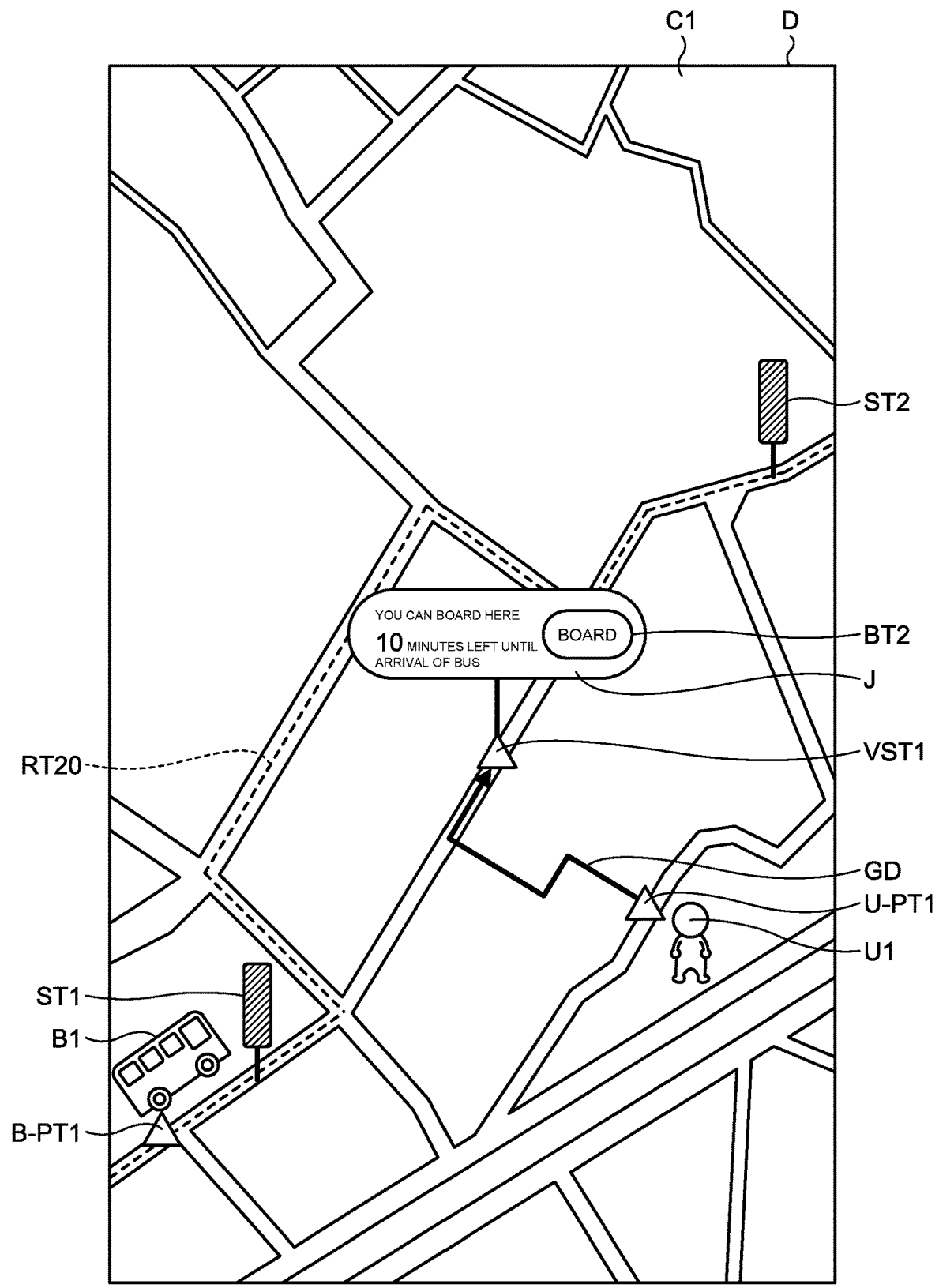
FIG. 7 is a diagram illustrating exemplary content for enabling declaration of an intention of boarding at a virtual bus stop position.

FIG. 7 illustrates exemplary content to enable indication of an intention to board at a virtual bus stop position. The example in FIG. 7 represents an exemplary screen in a case where content C1 to enable indication of an intention to board at the virtual bus stop position "VST1" is displayed on the display screen D of the terminal device 10. As illustrated in FIG. 7, the representor 136 distributes, to the terminal device 10, the content C1 in which location information J representing the location of the virtual bus stop position "VST1" is superimposed on map information (corresponding to MAP1 illustrated in FIG. 1) containing the current position of the user U1 and the virtual bus stop position "VST1".

As illustrated in FIG. 7, the location information J contains the button BT2. For example, by pressing the button BT2, the user U1 is able to indicate an intention to board at the virtual bus stop position "VST1" to the boarding intention determination device 100. Accordingly, the representor 136 determines whether the user U1 presses the button BT2 (step S108). When it is determined that the button BT2 is not pressed (NO at step S108), the representor 136 ends the process. On the other hand, when it is determined that the button BT2 is pressed (YES at step S108), the representor 136 represents guide information about the virtual bus stop "VST1" (step S109). For example, as illustrated in FIG. 7, the representor 136 causes a moving route GD from the current position "U-PT1" of the user U1 to the virtual bus stop position "VST1" to be displayed as the guide information.

As the virtual bus stop is not a physical bus stop, the user U1 may be not able to recognize the correct position of the virtual bus stop position "VST1" even when the user U1 is headed to the bus stop position "VST1" along the moving route GD. Thus, the representor 136 may display, for example, image information about the surroundings of the virtual bus stop position "VST1" as information about the surroundings of the virtual bus stop position "VST1".

When it is determined that the button BT2 is pressed (YES at step S108), the determining unit 134 actually sets a virtual bus stop in the virtual bus stop position "VST1" (step S109).

Although not illustrated in the drawings, the instruction unit 137 issues an instruction for the on-demand bus B1 to take a roundabout route to be headed to the virtual bus stop position "VST1" after passing through the existing bus stop ST1 and then travel toward the existing bus stop ST2.

4. Exemplary Effects of Position Determination Process

Using the flowchart illustrated in FIG. 8, the content of the process that is executed and realized by the determining unit 134 will be described. FIG. 8 is a flowchart illustrating an exemplary position determination process according to the embodiment.

According to the example illustrated in FIG. 7, in response to the determination by the determination unit 133 that the user U1 has an intention to board the on-demand bus B1, the determining unit 134 performs the position determination process to determine a position in which a virtual bus stop is to be set.

First of all, the determining unit 134 acquires attribute information corresponding to the user U1 from the user information storage 122 (step S201). In the example in FIG. 4, the determining unit 134 acquires age "33", gender "female" and physical information "pregnant" as the attribute information corresponding to the user U1. The determining unit 134 acquires road information and traffic information about the surroundings of the current position of the user U1 (step S202). As for the surroundings of the current position of the user U1, the determining unit 134 may acquire the information about roads and traffic within a given area with respect to the center position connecting the three positions that are, for example, the current position of the user U1, the position of the existing bus stop ST1 and the position of the existing bus stop ST2. The road information is, for example, information on whether there is an enough road width to stop the on-demand bus or the road is at repair. The traffic information is information on whether there is a traffic jam.

The determining unit 134 then determines a virtual bus stop position based on the attribute information about the user U1, the road information and the traffic information (step S203). For example, the determining unit 134 specifies a road on which it is possible to stop the on-demand bus B1 based on the road information and the traffic information. The determining unit 134 determines in which position on the specified road a virtual bus stop is to be set. For example, as the user U1 is moving toward the existing bus stop ST1, the determining unit 134 determines a virtual bus stop position such that the distance from the current position of the user U1 to the virtual bus stop position is shorter than the distance from the current position of the user U1 to the position of the existing bus ST1.

The determining unit 134 is able to determine a virtual bus stop position in consideration of the attribute information about the user U1. For example, the determination unit determines a virtual bus stop position based on a score corresponding to the attribute information about the user U1.

For example, a score is predetermined for each set of information corresponding to each attribute. For example, a score "2" is determined for the age "thirties", a score "2" is determined for the gender "female", and a score "7" is determined for the physical information "pregnant". The more the attribute information can increase a strain on the user, the higher the score that is set is. For example, scores are set as follows: a score "5" for attribute information "sixties" and a score "8" for physical information "wheel chair". For example, such score information may be stored in the user information storage 122.

In such a case, the determining unit 134 determines a virtual bus stop position based on a total score that is the sum of the scores of the respective sets of attribute information corresponding to the user U1. In the above-described example, the determining unit 134 calculates a total score "11" for the user U1. The higher the score of a user is, for example, the more the determining unit 134 determines that the physical strain of being headed to the bus stop on foot is large. Accordingly, the determining unit 134 determines a virtual bus stop position such that, the higher the total score of a user is, the more the distance from the current position of the user to the virtual bus stop position is shorter than the distance from the current position of the user to the position of the existing bus stop.

For example, when moving a long distance (such as 1 km or more) is imposed on the user U1 who is "pregnant", the physical strain on the user U1 increases. For this reason, even when the roundabout route has a longer distance, the determining unit 134 sets a virtual bus stop in a position closer to the current position of the user U1. Accordingly, the boarding intention determination device 100 according to the embodiment is able to increase convenience of the mobile object to the user.

As a matter of convenience in descriptions, assume the user U1 corresponds to the age "25", gender "female" and physical information "non". In that case, the user U1 is regarded as a person who has high physical ability and thus a relatively low score is calculated. Even when moving a long distance (for example, 1 km or more) is imposed, it is assumed that the physical strain is not large. Accordingly, the determining unit 134 sets a virtual bus stop in a position closer to the current position of the user U1 within an area such that the roundabout route is not longer than the given distance. Accordingly, the boarding intention determination device 100 according to the embodiment is able to control the length of the roundabout route according to the attribute information and thus is able to save costs of services (for example, gas costs and electricity costs).

Such a position determination process can be rephrased as a process to determine a virtual bus stop position such that the distance the user travels can be minimized based on the score corresponding to the attribute information.

5. Modification

The boarding intention determination device 100 according to the above-described embodiment may be carried out in various different modes in addition to the above-described embodiment. Other embodiments of the boarding intention determination device 100 will be described below.

5-1. Zone where Setting Virtual Bus Stop is Prohibited

The determining unit 134 may determine a position in which a virtual boarding spot is to be set outside a given spot based on a boarding spot for boarding the mobile object. For example, as for the given spot, the determining unit 134 determines a position in which a virtual boarding spot is to be set on a road excluding a road within a given distance from the boarding spot for boarding the mobile object. This aspect will be described using the example in FIG. 1.

For example, as it is determined that the positional relationship between the exiting bus stop ST1 and the user U1 meets the condition information on the positional relationship and it is determined that that the behavior information about the user U1 meets the condition information on the behavior information, the determining unit 134 determines a virtual bus stop position on a route outside a route within a given distance from the existing bus stop ST1 to which the user U1 is headed to. In other words, the determining unit 134 determines the route within the given distance from the existing bus stop ST1 as a setting-prohibited zone where any virtual bus stop must not be set and determines a virtual bus stop position outside the setting-prohibited zone.

The determining unit 134 may dynamically change the length of the given distance according to the services of the on-demand bus (such as the number of services and delays) and determine a virtual bus stop position on the route outside the route within the changed distance.

Accordingly, the boarding intention determination device 100 according to the embodiment is able to set a virtual bus stop in a position at an appropriate given distance from the existing bus stop and thus, for example, it is possible to prevent setting a virtual bus stop although there is an existing bus stop nearby and thus causing an unnecessary delay.

As for the given spot, the determining unit 134 determines a position in which a virtual boarding spot is to be set outside a given area whose center is the boarding spot for boarding the mobile object. Descriptions will be given similarly using FIG. 1.

For example, the determining unit 134 determines a virtual bus stop position outside the given area whose center is the existing bus stop ST1. In other words, the determining unit 134 determines the given area whose center is the existing bus stop ST1 as the setting-prohibited area where any virtual bus must not be set and determines a virtual bus stop position outside the setting-prohibited area.

The determining unit 134 may dynamically change the size (radial distance) of the given area according to the services of the on-demand bus (such as the number of services and delays) and determine a virtual bus stop position on the route outside the changed area.

The boarding intention determination device 100 also deals with a request to dispatch the on-demand bus to a spot in a state where the user already arrives at the spot with a reservation for the on-demand bus that is previously made or without the pre-reservation (instant call). For example, when the user U1 makes a reservation for the on-demand bus in advance, the determining unit 134 determines a virtual bus stop position based on the existing bus stop position and the current position of the user U1. Also in that case, the determining unit 134 is able to determine a virtual bus stop position on the route outside the route within the given distance from the existing bus stop or determine a virtual bus stop position outside the given area whose center is the existing bus stop. The determining unit 134 is able to dynamically change the length of the given distance or the size of the given area according to the service record of the on-demand bus in the past (such as the number of services and delays).

For example, the determining unit 134 refers to the service record storage 123 and dynamically changes the length of the given distance or the size of the given area based on the delay information about the reserved time, thereby determining a setting-prohibited zone (area) and determines a virtual bus stop position outside the setting-prohibited zone (area). For example, by determining the setting-prohibited zone (area) such that the setting-prohibited zone contains the zones where delays and traffic jams occur at the reserved time, the determining unit 134 is able to cause the on-demand bus to be in operation to come in time for the reserved time.

When the user U1 makes an instant call for the on-demand bus, the determining unit 134 determines a virtual bus stop position based on the existing bus stop position and the current position of the user U1. Similarly, the determining unit 134 is able to determine a virtual bus stop position on the route outside the route within the given distance from the existing bus stop or determine a virtual bus stop position outside the given area whose center is the existing bus stop. The determining unit 134 is able to dynamically change the length of the given distance or the size of the given area according to the current services of the on-demand bus (such as the number of services and delays).

5-2. Boarding Intention Determination Process (1)

The above-described embodiment represents the example where the determination unit 133 determines that the user has a boarding intention when the user starts moving toward the bookmarked existing bus stop in the state where the user views the countdown display of the remaining times until arrival of the on-demand bus at the respective bookmarked existing bus stops.

Existing bus stops however are not necessarily bookmarked. For example, when there is an existing bus stop that is used routinely, the existing bus stop may be bookmarked. On the other hand, when the user wants to use an on-demand bus on a trip, existing bus stops relating to the on-demand bus in the trip are less likely to be bookmarked. In such a case, even when the user has an intention to board the on-demand bus, a countdown display is not viewed.

In order to also deal with such a situation, the boarding intention determination device 100 is able to make a determination on a boarding intention based on whether information other the countdown display is viewed. Specifically, as for the case where the condition information is met, when the user views the content about the boarding spot for boarding the mobile object, the determination unit 133 determines that the user has an intention to board the mobile object. The content is, for example, a route search application.

For example, the determination unit 133 acquires a log of use of the route search application by the user U1.

When the log of use can be acquired, the determination unit 133 refers to the acquired log of use and determines whether there is a log indicating that the user U1 searched for a bus route relating to the surroundings of the current position of the user U1 within a given time back from the current time (for example, the time when the route guide application Ap is started). For example, when a log indicating that the user U1 used the route search application to search for a bus route relating to the surroundings of the current position can be acquired, the determination unit 133 determines that there is a possibility that the user U1 will move with the on-demand bus.

When it can be determined that there is a possibility that the user U1 will move with the on-demand bus based on the log of use and the user U1 starts moving toward the existing bus stop, the determination unit 133 determines that the user U1 has a boarding intention. For example, when the user U1 simply moves toward the existing bus stop, the user U1 may actually be headed to a shop down the existing bus stop. As there is however a trace indicating that the user U1 searched for a bus route around the current position in the last minute, the determination unit 133 is able to accurately determine that the user U1 has an intention to board the on-demand bus.

5-3. About Boarding Intention Determination Process (2)

The determination unit 133 may determine whether the user has an intention to board an on-demand bus based on a log of use of transposition by the user. For example, the determination unit 133 acquires a log of use of transportation by the user U1 and thus determines whether there is transportation that the user U1 may use routinely. For example, when the user U1 uses the on-demand bus every day, the determination unit 133 determines that the user U1 has an intention to board the on-demand bus at the time when the boarding guide application AP is started. Accordingly, the boarding intention determination device 100 according to the embodiment is able to accurately determine whether the user has a boarding intention.

About Setting Virtual Boarding Spot

In the above-described embodiment, when it is determined that the user has a boarding intention, the boarding intention determination device 100 determines a virtual bus stop position and represents that it is possible to board an on-demand bus at the determined virtual bus stop. The example where, when the boarding intention of the user is obtained (when the button BT2 illustrated in FIG. 7 is pressed), the boarding intention determination device 100 actually sets a virtual bus stop and causes the on-demand bus to be headed to the set position has been represented.

In the state where it can be determined that the user has a boarding intention, at the time when a position in which a virtual bus stop is to be set is determined, for example, the boarding intention determination device 100 may actually set a virtual bus stop in the determined virtual bus stop position without confirming the boarding intention with the button BT2. In such a case, the boarding intention determination device 100 represents guide information serving as a guide to the set virtual bus stop. Such a process corresponds to move to step S109 after step S104 in the flowchart illustrated in FIG. 6.

The boarding intention determination device 100 sets a virtual bus stop without confirming the boarding intention with the button BT2 because, in the boarding intention determination process, it can be accurately determined that the user has the boarding intention.

5-5. Displaying Possible Virtual Boarding Spots

The boarding intention determination device 100 may represent possible virtual bus stop positions to the user without performing the boarding intention determination process and actually set a virtual bus stop in a virtual bus stop position that is specified by the user. For example, when the user U1 starts the boarding guide application AP, the boarding intention determination device 100 determines whether there is a route on which an on-demand bus travels around the current position of the user U1 based on the current position of the user U1. When there is a route on which an on-demand bus travels, the boarding intention determination device 100 refers to the virtual bus stop position information storage 121 and acquires possible virtual bus stop positions corresponding to the on-demand bus. For example, based on the road information or the traffic information, the boarding intention determination device 100 acquires possible virtual bus stop positions, from among the virtual bus stop positions that are registered in the virtual bus stop position information storage 121, for each of which it is predicted that, even when a virtual bus stop is set, no adverse effect is given to the surrounding traffic, etc.

The boarding intention determination device 100 represents map information representing the acquired possible virtual bus stop positions to the user U1. When the user U1 specifies any one of the represented possible virtual bus stop positions, the boarding intention determination device 100 sets a virtual bus stop in the specified virtual bus stop position. The boarding intention determination device 100 represents guide information that leads the user U1 to the position in which the virtual bus stop is set.

Accordingly, the boarding intention determination device 100 is able to set a virtual bus stop reliably in a position desired by the user and thus is able to increase convenience to the user. The boarding intention determination device 100 is able to determine a virtual bus stop position from among the possible virtual bus stop positions that are registered in the virtual bus stop position information storage 121 also in the virtual bus stop position determination process that is described using FIG. 8.

5-6. About Mobile Object

In the above-described embodiment, an on-demand bus is described as an exemplary mobile object; however, modes of the mobile object are not limited to on-demand buses. For example, the mobile object may be a taxi that is an ordinary vehicle. Alternatively, the mobile objet may be a manned vehicle with a driver or a self-driving car without driver.

6. Hardware Configuration

The boarding intention determination device 100 according to the above-described embodiment is realized by, for example, a computer 1000 having a configuration like that illustrated in FIG. 9. FIG. 9 is a hardware configuration diagram illustrating the exemplary computer 1000 that realizes the functions of the boarding intention determination device 100. The computer 1000 includes a CPU 1100, a RAM 1200, a ROM 1300, a HDD 1400, a communication interface (I/F) 1500, an input-output interface (I/F) 1600 and a media interface (I/F) 1700.

The CPU 1100 operates according to the programs that are stored in the ROM 1300 or the HDD 1400 and controls each unit. The ROM 1300 stores a boot program that is executed by the CPU 1100 to start the computer 1000, a program that is dependent on the hardware of the computer 1000, etc.

The HDD 1400 stores a program that is executed by the CPU 1100, data that is used by the program, etc. The communication interface 1500 receives data from another device and transmits the data to the CPU 1100 via a communication network 50 and transmits data that is generated by the CPU 1100 to another device via the communication network 50.

The CPU 1100 controls an output device, such as a display or a printer, and an input device, such as a keyboard or a mouse, via the input-output interface 1600. The CPU 1100 acquires data from the input device via the input-output interface 1600. The CPU 1100 outputs generated data to the output device via the input-output interface 1600.

The media interface 1700 reads a program or data that is stored in a recording medium 1800 and provides the program or data to the CPU 1100 via the RAM 1200. The CPU 1100 loads the program from the recording medium 1800 into the RAM 1200 via the media interface 1700 and executes the loaded program. The recording medium 1800 is, for example, an optical recording medium, such as a digital versatile disc (DVD) or a phase change rewritable disk (PD), a Magneto-Optical recording medium, such as a magneto-optical disk, a tape medium, a magnetic recording medium, or a semiconductor memory.

For example, when the computer 1000 functions as the boarding intention determination device 100 according to the embodiment, the CPU 1100 of the computer 1000 executes the program that is loaded into the RAM 1200 to implement the function of the controller 130. The data of the storage 120 is stored in the HDD 1400. The CPU 1100 of the computer 1000 reads the programs from the recording medium 1800 and executes the programs. In another example, the programs may be acquired from another device via the communication network 50.

7. Others

Among the processes described in the above-described embodiments, all or part of processes that are described as automatically performed may be performed manually or all or part of processes that are described as manually performed may be performed automatically by a known method. Furthermore, the procedures, specific names, and information containing various types of data and parameters that are represented in the document and drawings may be changed optionally except as otherwise provided.

The components of each of the devices illustrated in the drawings are functional concepts and need not necessarily be configured physically as illustrated in the drawings. In other words, specific modes of distribution and integration of each device are not limited to those illustrated in the drawings, and all or part of the devices may be configured by being dispersed or integrated functionally or physically in any unit and according to various types of loads and the circumstances in which the devices are used.

It is also possible to combine the above-described embodiments as appropriate as long as no inconsistency is caused in the content of the processes.

8. Effect

The boarding intention determination device 100 according to the embodiment includes the acquisition unit 132 and the determination unit 133. The acquisition unit 132 acquires a positional relationship between boarding position information representing a boarding spot for boarding a mobile object and user position information representing a current position of a user. The determination unit 133 determines whether the user has an intention to board the mobile object based on the positional relationship that is acquired by the acquisition unit 132 and behavior information representing behaviors of the user.

Accordingly, the boarding intention determination device 100 according to the embodiment is able to accurately determine whether the user has a boarding intention and thus is able to increase efficiency of services of the mobile object.

When the positional relationship that is acquired by the acquisition unit 132 meets given condition information, the determination unit 133 determines that the user has the intention to board the mobile object.

Accordingly, the boarding intention determination device 100 according to the embodiment is able to accurately determine whether the user has a boarding intention.

When a case where the given condition information is met is a case where a distance between the boarding spot for boarding the mobile object and the current position of the user is within a given distance, the determination unit 133 determines that the user has the intention to board the mobile object.

For example, when the user is positioned near the spot to board the mobile object, the user is highly likely to board the mobile object. Accordingly, the boarding intention determination device 100 according to the embodiment is able to accurately determine whether the user has a boarding intention.

When the given distance is a distance for which it is predicted that a time required by the user to move from the current position of the user to the boarding spot is within a given time, the determination unit 133 determines that the user has the intention to board the mobile object.

For example, when the user is within the distance for which it is predicted that the time required by the user to move to the boarding spot is within the given time, the user is highly likely to board the mobile object. Accordingly, the boarding intention determination device 100 according to the embodiment is able to accurately determine whether the user has a boarding intention.

When the distance is a distance for which it is predicted that a time until arrival of the mobile object at the boarding spot is within the given time, the determination unit 133 determines that the user has the intention to board the mobile object.

For example, when the user is in a position at a distance such that the user is able to arrive the bus stop in a time shorter than a time taken by the mobile object to arrive the boarding spot, the user is highly likely to board the mobile object. Accordingly, the boarding intention determination device 100 according to the embodiment is able to accurately determine whether the user has a boarding intention.

When the behavior information representing behaviors of the user meets given condition information, the determination unit 133 determines that the user has the intention to board the mobile object.

By taking the condition information on the user behavior information into consideration in addition to the condition information on the positional relationship, the boarding intention determination device 100 according to the embodiment is able to accurately determine whether the user has a boarding intention.

When a case where the given condition information is met is a case where the user views content relating to the boarding spot for boarding the mobile object, the determination unit 133 determines that the user has the intention to board the mobile object.

The user who views the content relating to the boarding spot for boarding the mobile object is highly likely to board the mobile object. Accordingly, the boarding intention determination device 100 according to the embodiment is able to accurately determine whether the user has a boarding intention.

When a case where the given condition information is met is a case where the user views time information representing a time until arrival of the mobile object at a boarding spot, among boarding spots for boarding the mobile object, within a given distance from the current position of the user, the determination unit 133 determines that the user has the intention to board the mobile object.

The user who views the time information representing the time until arrival of the mobile object at the boarding spot is highly likely to board the mobile object. Accordingly, the boarding intention determination device 100 according to the embodiment is able to accurately determine whether the user has the boarding intention.

When a case where the given condition information is met is a case where the user starts moving toward the boarding spot for boarding the mobile object, the determination unit 133 determines that the user has the intention to board the mobile object.

The user who starts moving toward the boarding spot for boarding the mobile object is highly likely to board the mobile object. Accordingly, the boarding intention determination device 100 according to the embodiment is able to accurately determine whether the user has the boarding intention.

The boarding intention determination device 100 according to the embodiment further includes the determining unit 134 and the representor 136. The determining unit 134 determines a position in which a virtual boarding spot that is a boarding spot for boarding the mobile object and that is virtual is to be set. The representor 136 represents, to the user, that it is possible to board the mobile object at the virtual boarding spot whose corresponding position is determined by the determining unit 134.

Accordingly, the boarding intention determination device 100 according to the embodiment is able to set the virtual boarding spot according to the user and enables the user to board at the set virtual boarding spot, thereby enabling an increase in convenience to the user who uses the mobile object.

When the boarding spot for boarding the mobile object is within a given area from the current position of the user, the determining unit 134 determines the position in which the virtual boarding spot is to be set based on the user position information representing the current position and the boarding position information representing the boarding spot.

Accordingly, the boarding intention determination device 100 according to the embodiment is able to set the virtual boarding spot closer to the user than the boarding spot is and thus is able to increase convenience to the user who uses the mobile object.

The determining unit 134 determines the position in which the virtual boarding spot is to be set based on attribute information about the user.

Accordingly, the boarding intention determination device 100 according to the embodiment is able to set a virtual boarding spot, for example, in a position such that moving thereto does not place a strain on the user and thus is able to increase convenience for the user who uses the mobile object.

The determining unit 134 determines the position in which the virtual boarding spot is to be set based on a score corresponding to the attribute information about the user.

Accordingly, the boarding intention determination device 100 according to the embodiment is able to set a virtual boarding spot, for example, in a position such that moving thereto does not place a strain on the user and thus is able to increase convenience for the user who uses the mobile object.

The determining unit 134 determines the position in which the virtual boarding spot is to be set outside a given spot based on the boarding spot for boarding the mobile object.

Accordingly, the boarding intention determination device 100 according to the embodiment is able to increase efficiency of services of the mobile object and reduce costs of services of the mobile object.

As for the given spot, the determining unit 134 determines the position in which the virtual boarding spot is to be set on a road excluding a road within a given distance from the boarding spot for boarding the mobile object.

Accordingly, the boarding intention determination device 100 according to the embodiment is able to increase efficiency of services of the mobile object and reduce costs of services of the mobile object.

As for the given spot, the determining unit 134 determines the position in which the virtual boarding spot is to be set outside a given area whose center is the boarding spot for boarding the mobile object.

Accordingly, the boarding intention determination device 100 according to the embodiment is able to increase efficiency of services of the mobile object and reduce costs of services of the mobile object.

The embodiments of the present application have been described in detail according to some drawings; however, the embodiments are exemplified only and it is possible to carry out the invention, starting with the mode described in the disclosure part, in other modes where various modifications and improvements are made based on the knowledge of those skilled in the art.

The above-described "section, module or unit" may be read as "means" or "circuit". For example, the determining unit may be read as an determining means or an determining circuit.

According to an aspect of the embodiments, there is an effect that it is possible to carry a user who uses transportation to a destination efficiently while increasing convenience to the user.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A boarding intention determination device comprising: a processor programmed to:
acquire a positional relationship between boarding position information representing a position of a physical boarding place as an initial boarding spot for boarding a mobile object and user position information representing a current position of a user;
determine that the user has an intention to board the mobile object from the physical boarding place when:
(i) the positional relationship that is acquired by the processor meets predetermined condition information where a distance between the position of the physical boarding place and the current position of the user is within a given distance, and
(ii) behavior information representing behaviors of the user meets given condition information, the behavior information being obtained from a terminal device of the user, the given condition information being met in a case where the user starts moving toward the initial boarding spot for boarding the mobile object;
determine a position of a virtual boarding spot for boarding the mobile object that replaces the initial boarding spot, when it is determined that the user has the intention to board the mobile object; and
control a display of the terminal device to display information, to the user, indicating that it is possible to board the mobile object at the virtual boarding spot, and control the display to display a map image indicating a position of the user, a position of the virtual boarding spot, and navigation information for traveling from the position of the user to the position of the virtual boarding spot.

2. The boarding intention determination device according to claim 1, wherein, the given distance is a distance for which it is predicted that a time required by the user to move from the current position of the user to the initial boarding spot is within a given time.

3. The boarding intention determination device according to claim 2, wherein, the distance is a distance for which it is predicted that a time until arrival of the mobile object at the initial boarding spot is within the given time.

4. The boarding intention determination device according to claim 1, wherein, the given condition information is met when the user views content relating to the initial boarding spot for boarding the mobile object.

5. The boarding intention determination device according to claim 1, wherein, the given condition information is met when the user views time information representing a time until arrival of the mobile object at the initial boarding spot, within a given distance from the current position of the user.

6. The boarding intention determination device according to claim 1, wherein, when the initial boarding spot for boarding the mobile object is within a given area from the current position of the user, the processor is programmed to determine the position for the virtual boarding spot based on the user position information representing the current position and the boarding position information representing the initial boarding spot.

7. The boarding intention determination device according to claim 1, wherein the processor is programmed to determine the position for the virtual boarding spot based on attribute information about the user.

8. The boarding intention determination device according to claim 7, wherein the processor is programmed to determine the position for the virtual boarding spot based on a score corresponding to the attribute information about the user.

9. The boarding intention determination device according to claim 1, wherein the processor is programmed to determine the position for the virtual boarding spot as outside a given spot based on the initial boarding spot for boarding the mobile object.

10. The boarding intention determination device according to claim 9, wherein, as for the given spot, the processor is programmed to determine the position for the virtual boarding spot on a road excluding a road within a given distance from the initial boarding spot for boarding the mobile object.

11. The boarding intention determination device according to claim 9, wherein, as the given spot, the processor is programmed to determine the position for the virtual boarding spot as outside a given area whose center is the initial boarding spot for boarding the mobile object.

12. A boarding intention determination method that is executed by a boarding intention determination device including a processor, the method comprising:
- acquiring a positional relationship between boarding position information representing a position of a physical boarding place as an initial boarding spot for boarding a mobile object and user position information representing a current position of a user;
- determining that the user has an intention to board the mobile object from the physical boarding place given that:
  - (i) the positional relationship that is acquired by the processor meets predetermined condition information where a distance between the position of the physical boarding place and the current position of the user is within a given distance,
  - (ii) behavior information representing behaviors of the user meets given condition information, the behavior information being obtained from a terminal device of the user the given condition information being met in a case where the user starts moving toward the initial boarding spot for boarding the mobile object;
- determining a position of virtual boarding spot for boarding the mobile object that replaces the initial boarding spot, when it is determined that the user has the intention to board the mobile object; and
- controlling a display of the terminal device to display information, to the user, indicating that it is possible to board the mobile object at the virtual boarding spot, and controlling the display to display a map image indicating a position of the user, a position of the virtual boarding spot, and navigation information for traveling from the position of the user to the position of the virtual boarding spot.

13. A non-transitory computer-readable storage medium having stored therein a boarding intention determination program for causing a computer to execute a process comprising:
- acquiring a positional relationship between boarding position information representing a position of a physical boarding place as an initial boarding spot for boarding a mobile object and user position information representing a current position of a user;
- determining that the user has an intention to board the mobile object from the physical boarding place given that:
  - (i) the positional relationship that is acquired by the computer meets predetermined condition information where a distance between the position of the physical boarding place and the current position of the user is within a given distance,
  - (ii) behavior information representing behaviors of the user meets given condition information, the behavior information being obtained from a terminal device of the user the given condition information being met in a case where the user starts moving toward the initial boarding spot for boarding the mobile object;
- determining a position of virtual boarding spot for boarding the mobile object that replaces the initial boarding spot-, when it is determined that the user has the intention to board the mobile object; and
- controlling a display of the terminal device to display information, to the user, indicating that it is possible to board the mobile object at the virtual boarding spot, and controlling the display to display a map image indicating a position of the user, a position of the virtual boarding spot, and navigation information for traveling from the position of the user to the position of the virtual boarding spot.

* * * * *